Figures 1, 2:
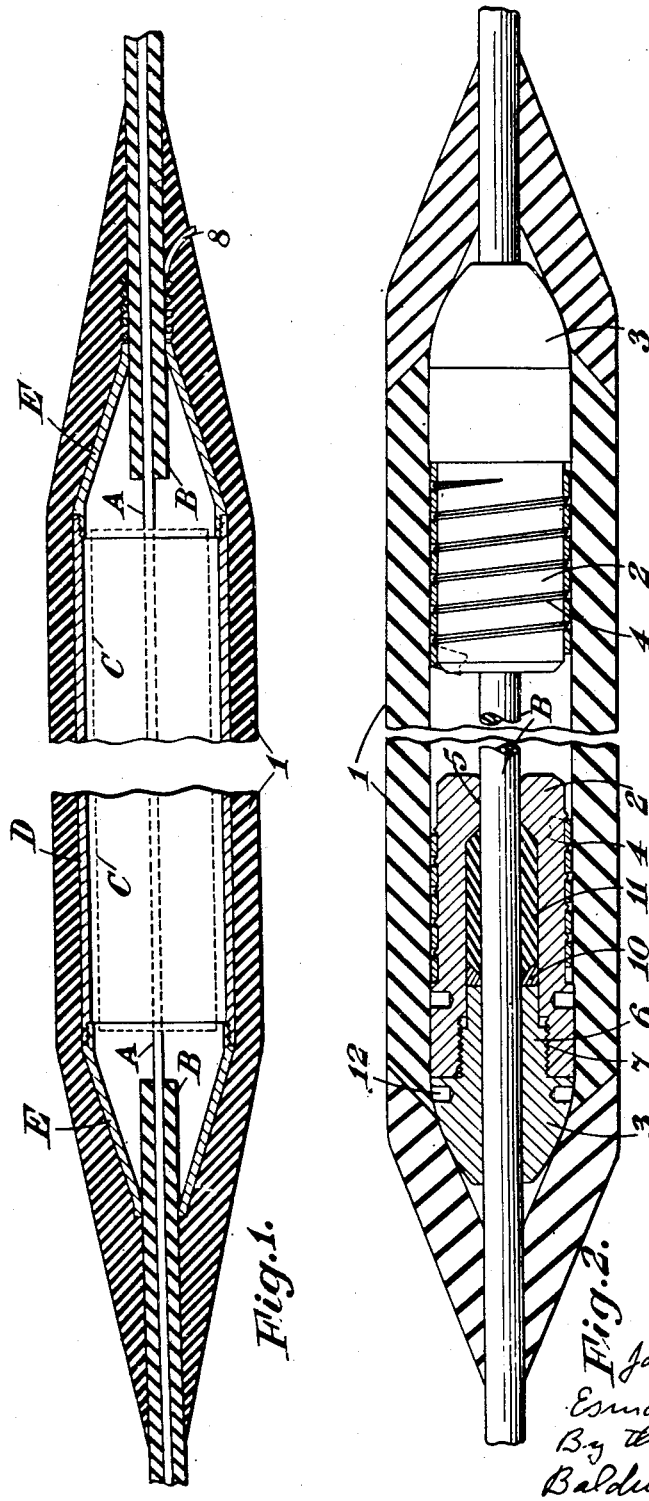

March 22, 1949.  J. N. DEAN ET AL  2,465,069
SUBMARINE CABLE
Filed July 9, 1946

Inventors:
John N. Dean
and
Esmond W. Smith,
By their attorneys,
Baldwin & Wight Patented Mar. 22, 1949

2,465,069

UNITED STATES PATENT OFFICE 2,465,069

SUBMARINE CABLE

John Norman Dean, Moretons, Westerham, and Esmond Wassell Smith, Beechcroft, Chislehurst, England, assignors to The Telegraph Construction and Maintenance Company Limited, London, England, a British company Application July 9, 1946, Serial No. 682,262
In Great Britain July 6, 1945

Section 1, Public Law 690, August 8, 1946
Patent expires July 6, 1965

4 Claims. (Cl. 174—70)

Whilst submarine cables are normally installed as continuous lengths, uniform in size, proposals have been made from time to time to incorporate units such as loading coils or repeaters at intervals along their lengths. These units are enclosed in housings or hollow containers, which may be separated from the cable but connected to it by short armoured insulated connectors, or which may be so shaped that they can be incorporated beneath the armouring of the cable, when they form a bulge of 2 or 3 times its diameter, extending along its length for a distance of, for example, 5 or 10 feet.

The function of such incorporated units is to improve transmission, for example, by loading or by thermionic amplification and for these purposes the insulation of the conductor must be broken in order that the conductor may be interrupted or tapped. Furthermore, the bared conductor and the apparatus within the housing must be protected against the ingress of moisture. Various types of glands and seals have been proposed to carry this into effect but in view of the large hydrostatic pressures, up to a few tons per square inch, to which submarine cables may be subjected, known or proposed methods of making water-tight junctions, where containers are inserted in cables, are not only highly complex but cannot be considered as absolutely reliable.

According to the present invention the ingress of moisture to a hollow container incorporated in a cable, is prevented by covering the container completely with a sheath of the plastic material of which the dielectric of the cable is composed or of a plastic material substantially the same as, or compatible with said dielectric, said sheath being unitary with or welded to the dielectric of the cable where said cable enters or leaves said container. Thus the apparatus enclosed in the said container is protected from moisture by an unbroken sheath of impervious plastic insulating material extending from one end of the system to the other.

The invention may be used in conjunction with known methods to give added security, or it may be applied to simplified sealing systems not in themselves possessing the required reliability in preventing the ingress of moisture.

We are aware that proposals have been made to enclose an impedance device attached to the end of a cable within a rubber-like sheath which is mechanically continuous with the sheath of the cable. We are also aware that the ends of a twin or a 4-core cable are commonly separated into single wires or pairs, said separated wires or pairs being enclosed in separate rubber-like sheaths which are mechanically continuous with a sheath of the main cable. The object of these measures is, however, to provide waterproof terminations to cables not normally under hydrostatic pressure, and further, the main connections penetrate through the end of the sheath in the form of bare wires, plugs or sockets, which have to be protected from moisture, if necessary, by separate and different means.

The above measures differ from our invention, in which the continuous protective sheath is extended without interruption over the cable and its incorporated containers from end to end over distances which may extend to hundreds of miles. Thus the only points of ingress for moisture in our system are at the ends themselves, which may be readily protected and which are not subjected to the hydrostatic pressure which affects in varying degrees according to the depth of the submersion, the main cable and its incorporated containers.

It is a further feature of this invention to provide a local earth connection for apparatus contained within the plastic sheathed housing, when such is required, by using a wire substantially completely embedded in the sheath and one of whose ends is attached to the apparatus therein, while the other is brought outside the plastic sheath and connected, for example, to the armouring of the cable.

The invention is diagrammatically illustrated in the accompanying drawings as applied to a submarine cable having a central conductor, Fig. 1 being a sectional view showing a submarine repeater fitted to the conductor and provided with a continuous plastic sheath in accordance with the invention.

Fig. 2 is a similar view of a modification, and showing the cable entry glands in detail.

Referring to the accompanying drawings A indicates the central conductor of the cable and B the di-electric, preferably the thermoplastic material known as polythene or a material having a polythene base, with which the cable is insulated throughout its length. C indicates generally a repeater or loading coil with which the conductor is provided at intervals throughout its length.

Enclosing the repeater is a housing D, which may be comprised of separate interlocking steel rings or of flexible metal tubing, and which in the embodiment illustrated is cylindrical. Housing D is fitted with detachable tapered end portions E through the openings in the end of which the cable core enters, these end portions normally incorporating a gland for securing the core.

According to the invention the entire repeater housing is provided with an outer layer 1 of dielectric material preferably of the same plastic material as that used for the insulation throughout the conductor. The dielectric layer 1 is extended to overlay the dielectric B of the conductor, to which it may be welded by moulding or extrusion.

The covering layer or sheath 1 of the repeater housing in Fig. 1 is in one piece throughout its length when it may be applied by a single moulding or extrusion process during which time an intimate bond between it and the cable dielectric is secured. In some cases where the repeater housing is of considerable length it may consist of a central section applied, e. g., by extrusion and separate end portions as shown in Fig. 2, the latter being applied by separate moulding operations during which they become intimately welded to the main sheath and the cable dielectric.

Referring now to Fig. 2 the repeater housing D is provided with cable entry glands, each comprising a body portion 2 and nose or cap piece 3 both perferably of brass; the body 2 is screwed externally as at 4 to engage with the helical corrugations of the flexible tubing of the repeater housing and is provided with a central bore 5 of a diameter closely to fit the core; the nose or cap piece 3 has a spigot end 6 which is screwed to fit a counterbore 7 in the body portion.

To assemble the gland, the cap 3 is first slid on to the end of the core followed by a metal thrust washer 10 and then by a soft rubber sleeve 11 adapted to grip the core, both the sleeve and washer being both a close fit within the interior of body portion 2. The cap and body portion are then screwed together and tightened by the tommy holes indicated at 12.

When the repeater assembly has been completed and the housing tightened in place, the sheath 1 of plastic material is applied, which is extended over the glands 2 for some distance along the cable dielectric B. This sheath is preferably of polythene and conveniently is applied by a single moulding process, to secure an intimate bond with the dielectric.

An earthing wire 8 (Fig. 1) may be either attached to or taken inside the housing. The wire 8, which is of substantial length, is in the example illustrated non-inductively wound round the tapered gland portion and/or the cable core and embedded in the plastic material. This wire makes contact at its inner end with the housing while its outer end may be connected to the armouring of the cable, or to an uninsulated outer conductor which may be provided in the known manner.

The earthing wire may be of any suitable length, by coiling, folding or shaping it to conform to the general shape of the sheath 1 and may be arranged to lie lengthwise of the core and/or housing instead of being wound round them. By causing it to take a lengthy route, it presents a path impenetrable to moisture for the duration of the useful life of the repeater or other apparatus contained within the housing.

What we claim is:

1. In a submarine cable, the combination with a central conductor insulated with dielectric material, of repeater apparatus provided at intervals throughout the length of the conductor, a housing for each repeater, a sheath of dielectric material completely encasing the housing and bonded to the cable insulation, and an earthing wire enclosed by the housing sheath except at its outer end and extending over a path within said sheath substantially longer than the linear distance from the end of the housing to the adjacent end of the sheath.

2. In a submarine cable, the combination with an intermittently loaded conductor, each loading consisting of repeater devices, an insulation layer comprising mainly polythene extending over the cable, a housing for each repeater device provided with a sheath comprising mainly polythene, said sheath being unitary with the insulation layer of the conductor, and an earthing wire enclosed by the housing sheath except at its outer end and extending over a path within said sheath substantially longer than the linear distance from the end of the housing to the adjacent end of the sheath.

3. A repeater device for a submarine cable having a central conductor provided with an insulation layer, comprising mainly polythene, said device comprising a housing constituted by a length of corrugated flexible metallic tubing, cable entry glands at each end of the housing, said glands being threaded to mate with the helical corrugations of the tubing to form closures for the ends of the housing, and an insulation sheath for the housing, said sheath being mainly of polythene and united by moulding to the cable insulation.

4. A repeater device for a submarine cable having a central conductor provided with insulation including a dielectric layer, said device comprising a housing constituted by a length of helically corrugated flexible metallic tubing; separable two-piece glands within the housing to receive the conductor ends, each of said glands including a body portion which is threaded to mate with the helical corrugations of the tubing to form closures for the ends of the housing; and a sheath of dielectric material enclosing the housing and united to the dielectric layer of the conductor.

JOHN NORMAN DEAN.
ESMOND WASSELL SMITH.

REFERENCES CITED

The following references are of record in the file of this patent:

UNITED STATES PATENTS

| Number | Name | Date |
| --- | --- | --- |
| 2,059,055 | Studt | Oct. 27, 1936 |
| 2,158,492 | Bishop | May 16, 1939 |
| 2,261,613 | Bishop | Nov. 4, 1941 |
| 2,274,422 | Mahoney | Feb. 24, 1942 |
| 2,344,635 | Priestley | Mar. 21, 1944 |

OTHER REFERENCES

Modern Plastics, "A New Dielectric for Cables," July, 1944, pages 90 and 91.
Modern Plastics, "Polyethylene—a New Thermoplastic," February, 1944, pages 99, 178, 180.